United States Patent [19]

Slat et al.

[11] Patent Number: 5,688,572

[45] Date of Patent: Nov. 18, 1997

[54] MULTI-LAYER CONTAINERS

[75] Inventors: William A. Slat, Brooklyn, Mich.; Richard C. Darr, Seville, Ohio

[73] Assignee: Plastipak Packaging, Inc., Plymouth, Mich.

[21] Appl. No.: 401,162

[22] Filed: Mar. 9, 1995

Related U.S. Application Data

[62] Division of Ser. No. 271,088, Jul. 6, 1994, Pat. No. 5,464, 106.

[51] Int. Cl.⁶ .................................. B65D 1/02; B32B 1/02
[52] U.S. Cl. .................. 428/36.91; 428/35.7; 428/36.7; 428/36.9; 428/213; 428/542.8; 428/903.3; 215/12.2
[58] Field of Search ................... 428/36.7, 36.9, 428/36.91, 35.7, 542.8, 213, 903.3; 215/1 C, 12.1, 12.2, 373; 220/415, 454, 455, 456, 457

[56] References Cited

U.S. PATENT DOCUMENTS

| | | | |
|---|---|---|---|
| 3,955,697 | 5/1976 | Valyi | 428/36.7 |
| 4,501,781 | 2/1985 | Kushida et al. | 215/12.2 |
| 4,646,925 | 3/1987 | Nohara | 215/12.2 |
| 4,725,464 | 2/1988 | Collette | 428/542.8 |
| 4,743,479 | 5/1988 | Nakamura et al. | 428/36.7 |
| 4,959,421 | 9/1990 | Hirahara et al. | 428/34.1 |
| 5,104,706 | 4/1992 | Krishnakumar et al. | 428/542.8 |
| 5,281,360 | 1/1994 | Hong et al. | 428/35.8 |

*Primary Examiner*—Rena Dye
*Attorney, Agent, or Firm*—Bachman & LaPointe, P.C.

[57] ABSTRACT

A multi-layer preform for forming multi-layer containers includes an extruded upper portion having a first thickness which is adapted to form an upper portion of a container. The preform also includes an extruded intermediate portion having a second thickness thicker than the first thickness. The intermediate portion is connected with the upper portion and is adapted to form an intermediate body portion of the container. The preform also includes an extruded base portion having a third thickness thicker than the second thickness. The base portion is connected with the intermediate portion and is adapted form a base portion of the container. The portions of the preform are preferably formed from an inner layer and a barrier layer wherein the layers are co-extruded for forming the preform and an outer injection molded layer. In one embodiment, the inner layer includes a lip which overlaps the top edge of the barrier and outer layers. A multi-layer container is then formable from blow molding the preform.

13 Claims, 5 Drawing Sheets

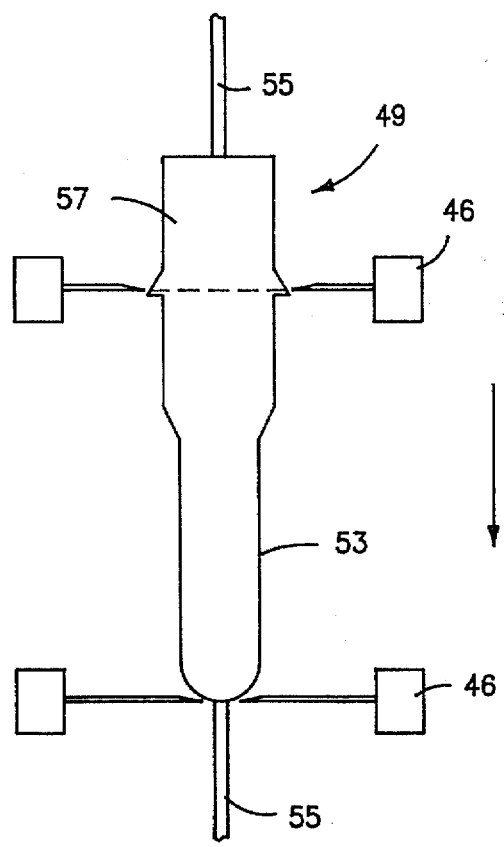
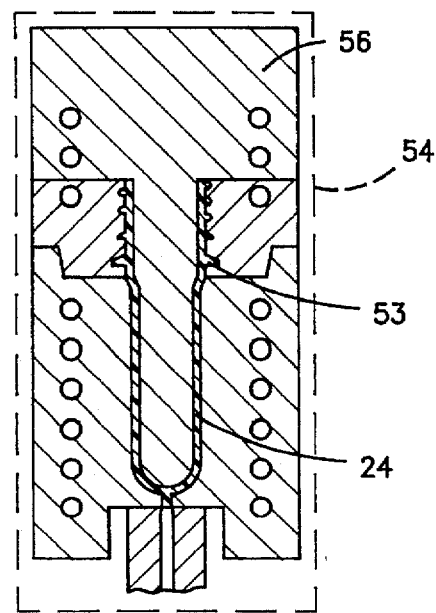
FIG-2B

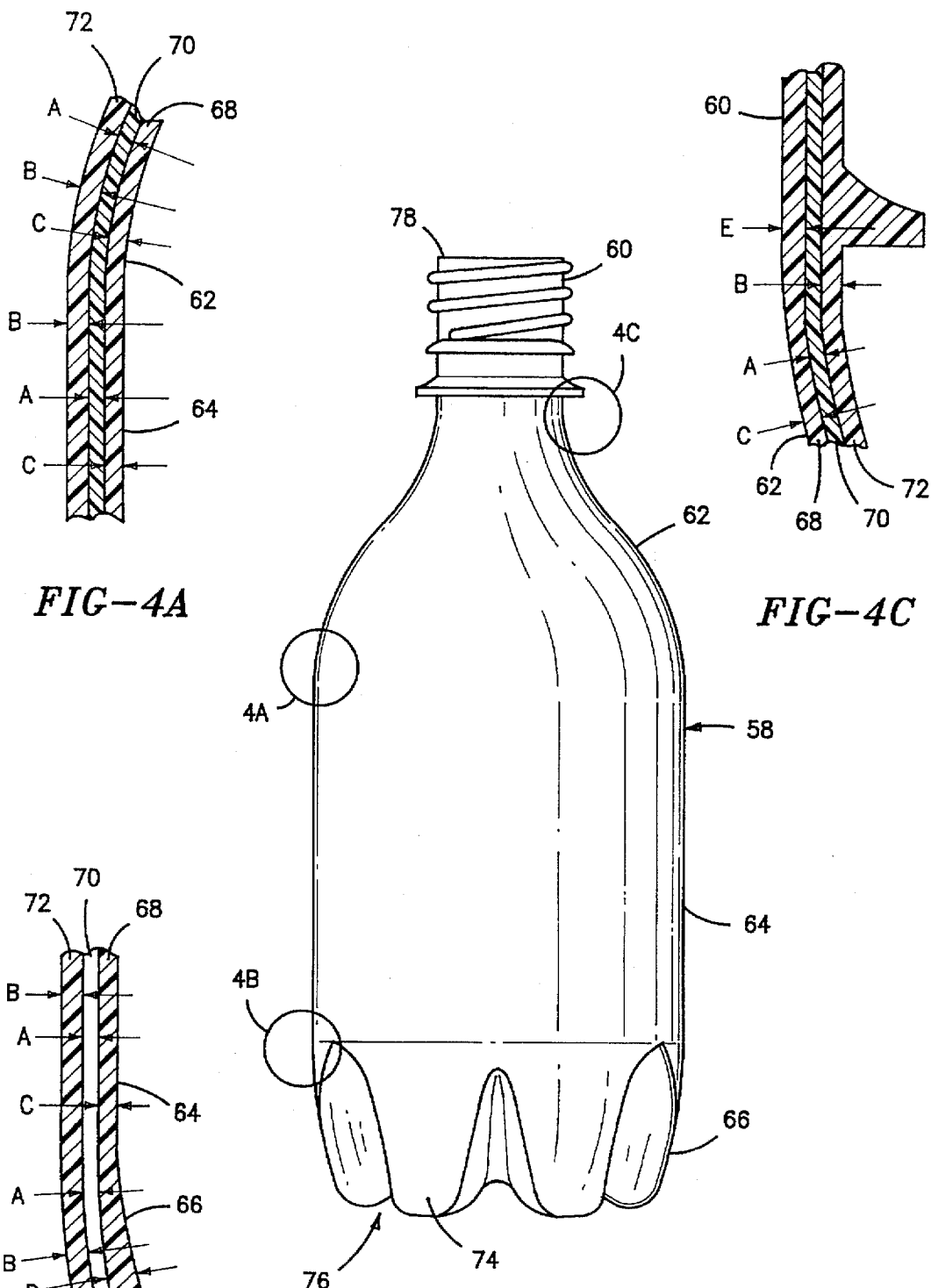

MULTI-LAYER CONTAINERS

This is a Division of application Ser. No. 08/271,088 filed Jul. 6, 1994 now U.S. Pat. No. 5,464,106.

BACKGROUND OF THE INVENTION

This invention is directed toward containers and container preforms, and more particularly to multi-layer containers and container preforms.

Multi-layer containers are typically manufactured for allowing the use of different materials in each of the layers, wherein each material has a specific property adapted to perform the specific function of the layer. The multi-layer containers are manufactured in a variety of ways as represented in the following devices and methods.

For example, U.S. Pat. No. 4,741,936 discloses a laminated preform for a multi-layer polyester bottle. In forming the preform, the process includes forming by co-extrusion a pipe having inner and outer layers of polyester composed mainly of ethylene terephthalate units and an intermediate layer an oxygen-barrier resin interposed between the inner and outer layers. An adhesive resin is also preferably interposed between every two adjacent layers. The thickness of the layers of the multi-layer pipe are sized to be uniform. The process for forming the preform includes cooling the outer portion of the molten multi-layer pipe by contact with water and simultaneously introducing an inert gas into the interior of the pipe to cool the inner portion. The pipe is later draw-formed into a multi-layer drawn bottle. The multi-layer bottle disclosed in U.S. Pat. No. 4,741,936, while including a plurality of layers having different properties for different functions, discloses no process or device for causing thickness variations at selected portions of the bottle and on selected layers. Accordingly, the thicknesses at each portion of the bottle are limited by the feasibility of the same thickness at other portions, thereby decreasing the usefulness of the container.

U.S. Pat. No. 4,646,925 discloses a multi-layer preform for draw forming a bottle which is formed by injection molding. The preform includes a neck portion having an open end and a part for engagement with a lid member. It further includes a thick barrel portion to be drawn and a closed bottom portion, wherein the neck portion and the inner wall of the bottom and barrel portions are integrally formed of a thermoplastic polyester. A thin intermediate layer composed of a gas-barrier thermoplastic resin is formed on the inner walls of the barrel and bottom portions so that the top end of the intermediate layer is extended to a point just below the neck portion. An outer layer of thermoplastic polyester is formed in such a positional relation so that the outer layer covers the intermediate layer. A joint is formed directly on the intermediate layer between the outer layer and the neck portion just below the neck portion. Being that the preform is formed from injection molding, thickness variation is directly dependent upon the shape of the mold. Therefore, a particular thickness design cannot be formed unless a new mold is also formed thereby decreasing the freedom for thickness variation for facilitating different functions.

Because the different portions of containers perform different functions, it is often desirable to vary the thickness of the container walls at the specific portion depending upon its function. For example, where a portion of a container is used for supporting the entire container, a thicker wall thickness might be preferred for additional strength. However, such additional thickness may not be desirable in other portions of the container, such as the sidewalls, due to such factors as desired flexibility, transparency and efficiency in material use. Therefore, for single-layer and multi-layer containers, it is often desirable to vary the thickness of the various layers at different portions of the container.

U.S. Pat. No. 3,869,056 discloses a multi-layered hollow plastic container. The container disclosed has an inner thermoplastic layer and an outer pressure molded layer. The container also has an integral open neck or rim portion wherein the thickness of the layers at the neck and rim portion are greater than the thickness of the layers in the remainder of the container. At the upper end of the container, the inner layer of the container overlaps the outer layer of the container at the neck or rim portion. While this patent discloses a container having variable thickness at the neck portion in comparison to the remaining portions of the container, such variable thickness is not applicable to other portions.

There exists a need, therefore, in the container manufacturing art, for a preform and container having multiple layers of material wherein the layers are subject to high accuracy thickness variability for serving the function of specific portions of the container and a process for accomplishing the same.

SUMMARY OF THE INVENTION

The primary object of the present invention is to provide a preform and container, and a process for forming the same, formed from multiple layers wherein at least one layer has varied thicknesses for different portions of the container.

Another object of this invention is to provide a preform, and a process for forming the same, for forming a container which is highly convenient to recycling.

Yet another object of this invention is to provide a preform and container, and a process for forming the same, having multiple layers wherein the inner layer is of minimal thickness for material saving purposes but variable in thickness at different portions of the container for accomplishing different functions.

Still another object of this invention is to provide a multi-layer preform and container, and a process for forming the same, wherein each layer has a specific function such as a barrier layer, a contents contact layer, and an outer layer.

The foregoing objects are attained by the inventive multi-layer preform for forming multi-layer containers, of the present invention, and the process for forming the same, wherein the preforms include an extruded inner layer including an upper portion having a first thickness which is adapted to form an upper portion of a container. The inner layer also includes an extruded intermediate portion having a second thickness thicker than the first thickness. The intermediate portion is substantially adjacent the upper portion and is adapted to form an intermediate portion of the container. The inner layer also includes an extruded base portion having a third thickness thicker than the second thickness. The base portion is substantially adjacent the intermediate portion and is adapted to be form a base portion of the container. The preform also includes an injected molded outer layer. In one embodiment, the preform includes a barrier layer of material wherein the barrier and inner layers are co-extruded. In one embodiment, the inner layer includes a lip which overlaps the top end of the barrier layer and outer layer.

The process for forming the multi-layer preform includes providing an extrusion means having a material thickness adjustment means; extruding at least a first layer of material via the extrusion means and forming a preform liner which forms a cavity; and varying the thickness of the liner substantially during the step of extruding along the length of the preform via the thickness adjustment means. This process may further include inserting the preform liner into an injection mold; and injection molding another layer of material adjacent the first layer, forming an outer wall of the preform. The process may also include the steps of adjusting the material thickness adjustment means for acquiring a first width of an upper portion; adjusting the material thickness adjustment means for acquiring a second width of the intermediate portion wherein the second width is thicker than the first width; and adjusting the material thickness adjustment means for acquiring a third width of the base portion, wherein the third width is thicker than the second width.

The container formed by the preform described above includes an upper wall portion formed from at least an inner layer and an outer layer of material wherein the inner layer of material has a first thickness at the upper wall portion. The container also includes an intermediate wall portion formed from at least the inner and the outer layer of material. The inner layer of material has a second thickness at the intermediate wall portion which is thinner than the first thickness at the upper wall portion and the intermediate wall portion is positioned adjacent the upper wall portion. The container also includes a footed base wall portion formed from at least the inner layer and the outer layer of material. The inner layer of material has a third thickness at the base wall portion thicker than the second thickness at the intermediate wall portion and the base wall portion is positioned adjacent to the intermediate wall portion and adapted to support the container.

The process for forming the container includes in addition to the steps described above for forming the preform, and during or immediately following the extrusion of the preform, subjecting the preform to blow molding. Thereafter, the preform is shaped into the shape of the blow mold which forms the shape of the container. As a result, a multi-layer container having a variable thickness inner wall is formed.

The details of the present invention are set out in the following description and drawings wherein like reference characters depict like elements.

BRIEF DESCRIPTION OF THE DRAWINGS

FIGS. 2a and 2b are a simplified representation of the process for forming the preform showing an extrusion step, a blow molding step, a cutting step and an injection molding step in accordance with the principles of the present invention.

FIG. 4 is an elevational view of a container in accordance with the process steps of FIG. 2 and the principles of the present invention.

FIGS. 4a, 4b and 4c are cross-sectional and enlarged views of various areas of the container wherein the relative thicknesses of the layers forming the container are shown.

DETAILED DESCRIPTION OF THE PREFERRED EMBODIMENT

Figure 1A:
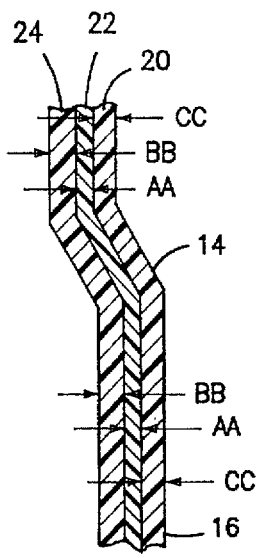
FIGS. 1a, 1b and 1c are enlarged cross-sectional views of various areas of the preform of FIG. 1, showing relative changes in layer thickness between different areas of the preform.
Figure 1C:
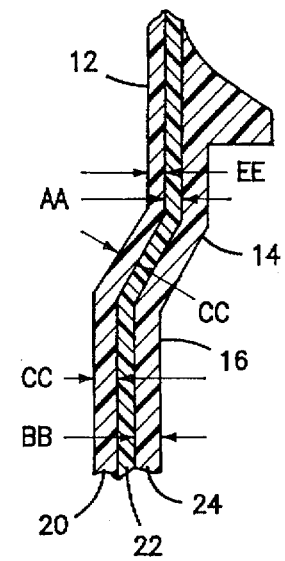
Figure 1:
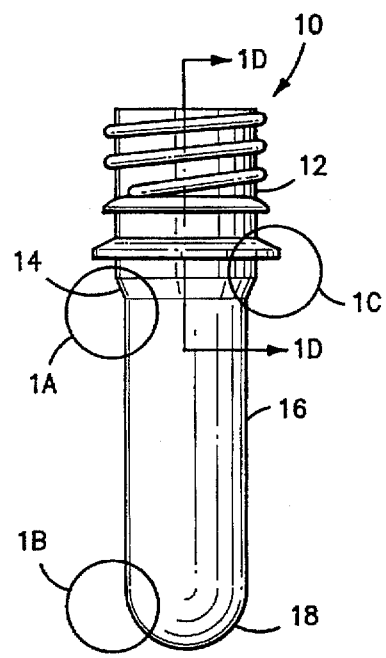
FIG. 1 is an elevational view of a preform in accordance with the principles of the present invention.

Referring now to the drawings in detail, wherein like reference numerals and letters designate like elements, there is shown in FIG. 1 an elevational view of a preform, in accordance with the principles of the present invention, designated generally as 10. Preform 10 typically includes a threaded and flanged upper portion 12, an angled intermediate portion 14, a vertical intermediate portion 16 and a base portion 18. In the configuration as shown in FIG. 1, preform 10 is adapted to be blow molded into a container (shown in FIG. 4), in accordance with the principles of the present invention.

Referring now to FIG. 1A, preform 10 is preferably formed from three layers of material, an encircling inner layer 20, a encircling barrier layer 22, and an encircling outer layer 24. As can be seen from FIGS. 1A–1C, the thicknesses of the inner layer varies in accordance with specific portions of preform 10. In the three-layer embodiment, barrier layer 22 and outer layer 24 maintain a constant thickness AA and BB, respectively, substantially over the entire body of preform 10. Outer layer 24 varies in thickness at threaded and flanged upper portion 12. Inner layer 20 varies in thickness depending upon the portion of the bottle, i.e., threaded and flanged upper portion 12, angled and vertical intermediate portions 14 and 16, and base portion 18.

Inner layer 20 and barrier layer 22 are preferably extruded via an extrusion process discussed below, and outer layer 24 is formed onto the extruded layers via an injection molding process, which allows the formation of the threaded upper portion 12. As a result of the extrusion process, inner layer 20 can be controllably adjusted in thickness based upon the functions to be performed by the various portions comprising preform 10 and the container.

Variations in thickness of inner layer 20 are desirable for several reasons which include aesthetics, efficient material use and reduced costs, and variable strength requirements. Efficient material use is evident in inner layer 20 at upper portion 12, where inner layer 20 is thinnest. Strength considerations are evident in base portion 18, where additional support is required and as a result, inner layer 20 is thickest.

Figure 1B:
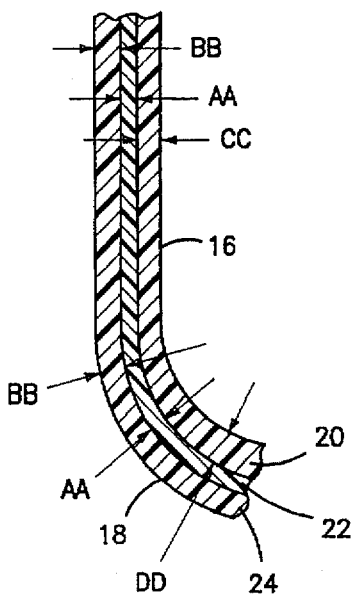

Referring now in detail to FIGS. 1A–1C, which represent enlarged detailed views of areas 1A, 1B and 1C, respectively, of FIG. 1, inner layer 20 is preferably formed from polyethylene terephthalate (PET) or polyethylene naphthalate (PEN). PEN, if FDA approved for use as an inner containment contact layer, is the preferred material. Barrier layer 22 is preferably formed from PEN, saran and ethylene vinyl alcohol copolymers (EVOH) or acrylonitrile copolymers, such as Barex 210. The term saran is used in its normal commercial sense to contemplate polymers made for example by polymerizing vinylidene chloride and vinyl chloride or methyl acrylate. Additional monomers may be included as is well known. Vinylidene chloride polymers are the most commonly used, but other oxygen barrier materials are well known.

As shown in FIG. 1A, the thickness of inner layer 20 at the intermediate portions is indicated as CC. Thickness CC is of medium thickness in comparison to the upper and base portions. At the intermediate portions 14 and 16, the medium thickness layer is used because this portion of the preform wall is to be used for containment purposes, but not for support. Referring now to FIG. 1B, the thickness of inner layer 20 is shown for base portion 18 as DD. The thickness DD is larger than the thickness CC, wherein thickness DD has a thickness increase over thickness CC of approximately 25–50%. Larger thickness DD is preferable for base portion 18 in that base portion 18 is used to support the container (shown in FIG. 4) formed by preform 10. Base portion 18 is formed into a footed support (shown in FIG. 4), and therefore is necessarily thicker for withstanding the weight of the container and its contents. With reference to FIG. 1C, inner layer 20 is also shown to have a thickness CC until it reaches threaded upper portion 12 of preform 10. At threaded upper portion 12, inner layer 20 has a thickness of EE which is less than thickness CC, having a thickness decrease from thickness CC of approximately 25–50%. Because of the lack of containment or other support required at threaded upper portion 12, it is preferable here that thickness EE is used, which saves on material usage.

In FIGS. 1A–1C, barrier layer 22 and outer layer 24 are shown to have constant thicknesses of AA and BB, respectively. Thickness of barrier layer 22 because it is co-extruded with inner layer 20, can be altered as well. However, this is generally not required since barrier layer 22 acts only as a substance barrier and not as a means for support and a uniform barrier thickness is sufficient to act as the barrier regardless of the thicknesses of other layers. Thickness BB of outer layer 24, is determined by an injection mold (shown schematically in FIG. 2B) and again, typically is of a uniform thickness over the entire preform 10. Outer layer 24 is typically used for structurally altering the preform, such as the thread formation for capping, and subsequently the container (shown in FIG. 4), and also for aesthetics such as to provide color or insignia to the container.

Figure 1D:
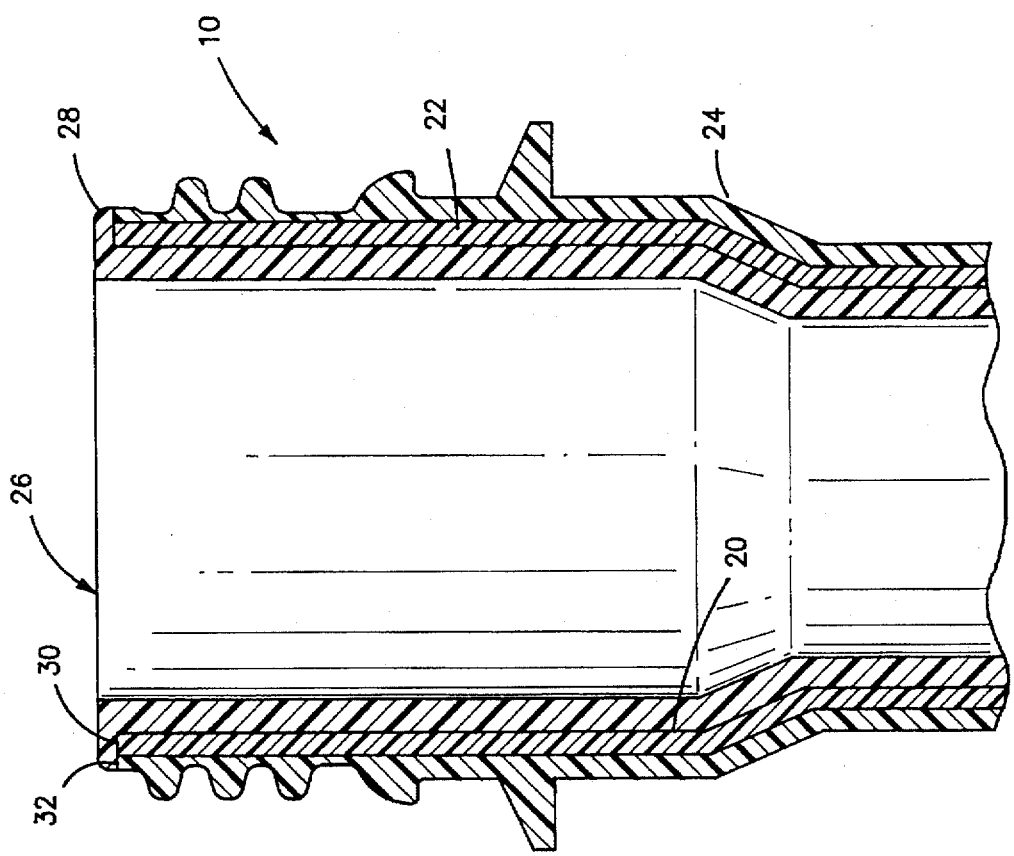
FIG. 1d is an enlarged cross-sectional view of the top end of the preform of FIG. 1, in accordance with the principles of the present invention.

An enlarged and cross-sectional view of threaded upper portion 12 of preform 10 is shown in FIG. 1D. As can be seen by referring to the top open end 26 of preform 10, inner layer 20 includes lip 28, extending substantially transversely to the remainder of inner layer 20, which extends over the top edges 30 and 32 of barrier layer 22 and outer layer 24, respectively. The lip configuration and its relation to barrier layer 22 and outer layer 24 is formed in the process discussed below, i.e., a combination of extrusion and injection molding steps. Lip 28 is formed for maintaining inner layer 20 as the only layer which contacts the contents held in the container (shown in FIG. 4), even during the removal of the contents from the container, for example, via pouring.

Figure 2A:
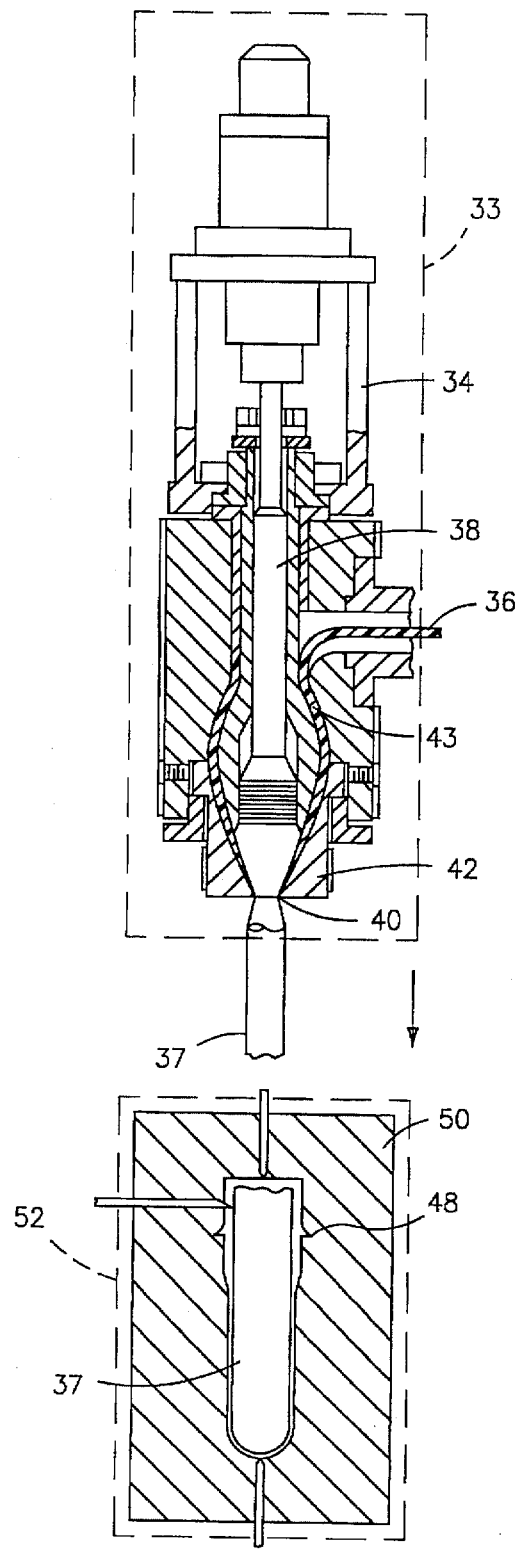

With reference to FIGS. 2A and 2B, the process for forming preform 10 will be described. In forming preform 10, inner layer 20, and if used, barrier layer 22 (see FIG. 1) are extruded via an extruder 33 and extruder head 34. Accordingly, melt 36 is formed into a substantially cylindrically shaped member 37 used for forming the cylindrical wall portion of preform 10. For varying the thickness of the upper, intermediate, and base portions of preform 10, a melt thickness adjustment device 38 is used with extruder 34. Adjustment device 38 is preferably in the form of a die pin stem designed for reciprocal motion and positioned in adjacent relationship with the exit area 40 of melt 36 through die bushing 42. By reciprocally moving die pin 38, the thickness of the wall forming the cylindrically shaped member 37, specifically inner layer 20 (see FIG. 1) thereof, can be achieved. However, depending upon the design of extruder 34, barrier layer 22 (see FIG. 1) can also be co-extruded with inner layer 20 and have thickness variations along the portions comprising preform 10, so as to efficiently use the material comprising the barrier layer. Additionally, die bushing 42 may be adjustable in the direction substantially transverse to melt flow for achieving inner layer 20 thicknesses which are non uniform in the circumferential direction. That is, portions of inner layer 20 located on the same circumferential line could have different thicknesses.

Cylindrically shaped member 37, the extrudiate, exits extruder head 34, one continuous length. Accordingly, member 37 must be cut into lengths which are suitable for forming a particular size container. Such cutting is accomplished by a cutting device (not shown) positioned in the course of blow molding after extruder head 34.

As discussed previously for the FIG. 1D description, inner layer 20 of preform 10 has lip 28 which extends over outer layer 24 and, if used, barrier layer 22. Lip 28 is formed via the combined efforts of the extruder 33 (shown in dotted lines) and extruder header 34 and subsequent trimming of extrudiate member 37 after it is ejected from blow mold 50. The trimming is performed via a cutting device 46, shown in FIG. 2B.

By controlling reciprocating die pin 38 and moving the same in and away from die bushing 42 and exit area 40, the thickness of member 37 can be varied along the length thereof to acquire thickness ratios as previously described. As shown in FIG. 2B, member 37 is caused to exit the extruder head 34 and is directed into a blow molder 52 where a circumferential ridge 48 is formed thereon via the shape of blow mold 50. While in blow mold 50, extrudiate member 37 is formed via blow molding into molded member 49 shown in FIG. 2B. The molded member 49 may also be formed by a blow mold such that the member is formed from two liners connected end to end, having ridge 48 in the middle. Molded member 49, having the appropriate thicknesses, is then cooled to the proper temperature and ejected from blow mold 50 of blow molder 52. During the blow molding process, the ends of molded member 49 are sealed resulting in excess plastic 55. In addition, portion 57 extends beyond the would be length of preform 53 and is used for assisting the cutting of molded member 49 for forming ridge 48. Cutting device 46 is used to trim excess material 55 and portion 57 from molded member 49 in a subsequent cutting operation for forming preform liner 53. By cutting top portion 57 off molded member 49, lip 28 is formed for extension over the outer layer to be formed in a subsequent injection molding process.

Figure 3:
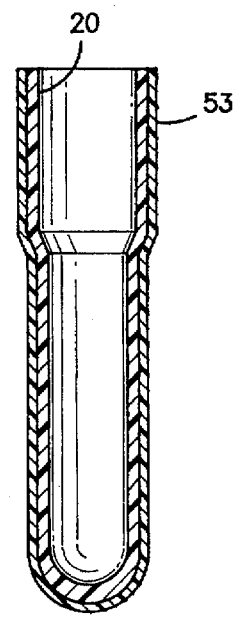
FIG. 3 is an elevational and cross-sectional view of a preform liner after the extrusion, blow molding and cutting process steps are performed as shown in FIGS. 2.

After liner 53 is formed into the shape as shown in FIG. 3, via blow molder 52, liner 53 is moved into an injection molder 54, shown by dotted lines in FIG. 2B, having an injection mold 56 for forming outer layer 24 (see FIG. 1) over liner 53. Accordingly, injection mold 56 is in the shape of preform 10, shown in FIG. 1. Injection molder 54 injects outer layer 24 over liner 53 for finishing the formation of the preform. As discussed above, the melt used to form outer layer 24 is preferably recycled PET and is adapted to be used for forming aesthetic features such as color and surface designs, and functional features such as threads and flanges. However, as discussed above, with the exception of upper threaded portion 12, the thickness of outer layer 24 as formed by injection molder 54 is maintained as uniform thickness BB (see FIGS. 1). By maintaining this thickness uniform, the preform can be much more easily removed from injection mold 56.

With reference now to FIG. 4, a container 58 is shown which is formed from preform 10 (see FIG. 1) via a blow molding operation, to be discussed below. Similar to the preform, container 58 includes a threaded upper portion 60, an angled intermediate portion 62, a substantially vertical intermediate portion 64 and a footed base portion 66. As shown in FIG. 4A, container 58 also has three layers of material, having properties and relative thickness relationships differing, however, from the layers of materials described for preform 10 in FIG. 1.

Referring to FIGS. 4A-4C, which represent enlarged detailed views of areas 4A, 4B and 4C, respectively, of FIG. 4, container 58 includes inner layer 68, barrier layer 70 and outer layer 72. Because inner layer 68 is not subject to blowing, as discussed below, in forming the container shape, the thickness ratios between the various portions of the container differ from those discussed above for inner layer 20 of preform 10 (see FIG. 1). FIGS. 4A, 4B, and 4C correspond to FIGS. 1A, 1B and 1C of preform 10 and thicknesses A-E correspond to thicknesses AA-EE. As shown in FIG. 4a, inner layer 68 has a thickness of C at angled and vertical intermediate portions 62 and 64, respectively. Thickness C is thinnest with regard to the thicknesses at the other portions. Referring to FIG. 4B, inner layer 68 has a thickness of D, thicker than thickness C, at the footed base portion 66 so as to strengthen this support area of container 58. Thickness D of the inner wall at base portion 66 is typically substantially equal to thickness E at the upper threaded portion 60. However, this relationship may vary depending, at least partly, on the size of the container, which could cause thickness D to be thicker or thinner than thickness E. In footed base portion 66, inner layer 68 is formed into a plurality of circumferentially positioned feet 74 whose function is to sturdily support container 58 on a flat surface. Feet 74 extend circumferentially around the lower end 76 of container 58. Each foot 74 is defined by an indent on each vertical side thereof, each of which extends from a central area of the bottom of container 58 upwardly on the circumference of container 58 toward top end 78 of container 58. Due to the increased thickness of inner layer 68 which forms footed base 66, feet 74 are substantially harder and less flexible than intermediate portions 62 and 64.

Referring now the FIG. 4C, in the threaded upper portion 60, corresponding directly with threaded upper portion 12 of preform 10 (see FIG. 1), inner layer 68 has a thickness E which is thicker than thickness C of the intermediate portions because it was not subject to blow molding. As discussed above for preform 10, and as shown in FIG. 1D, at top end 78, inner layer 68 includes lip 28, which extends over outer recycled layer 72 for avoiding contact of outer recycled layer 72 with contents exiting container 58. This is described in greater detail above for preform 10 and the process for making the same.

The multi-layer design of container 58 is advantageous to present day recycling efforts. Specifically, the layers forming container 58 are easily separable by pulling them apart and thus can be divided appropriately for recycling purposes. That is, if a particular material is not recyclable, this will not affect the recyclability of another layer. When more than one material is used, and if the layers do are not separate, recycling of containers can be difficult because the materials cannot be separated and properly categorized. With the multi-layer design disclosed herein, such a separation and categorization is achievable, while also allowing material thickness control.

Figure 5:
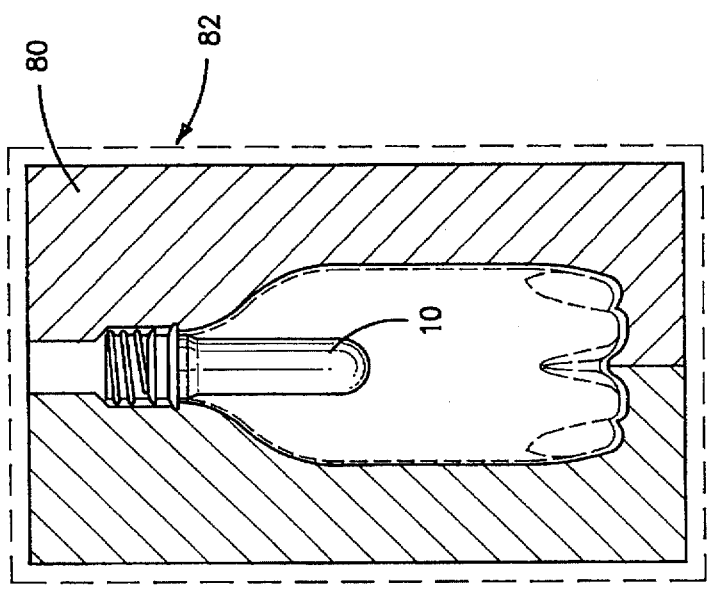
FIG. 5 is an elevational view showing the process of blow molding the preform into the container.

Referring now to FIG. 5, a process for forming container 58 (see FIG. 4) will be described. The process for forming container 58 includes the process described above for forming preform 10. In addition, and referring back to FIGS. 1 and 2, after outer layer 24 is added to liner 53 via injection molder 52, preform 10 is formed and is subsequently removed from injection mold 54. After removal, preform 10 is placed into blow mold 80, shown in FIG. 5. Before placing preform 10 into blow mold 80, it may be necessary to heat the preform. If preform 10 is immediately removed from injection molder 52 and placed into blow molder 82, shown by dotted lines in FIG. 5, preform 10 may be sufficiently heated. Otherwise, preform 10 should be placed into a heater (not shown) prior to placement into blow mold 80. Referring to FIG. 5, preform 10 is placed into blow mold 80 and held securely therein via engagement of the mold with threaded upper portion 12. Once proper placement of the preform is established, blow molder 82 is used to blow preform 10 into the shape of container 58 (see FIG. 4), shown by the dotted lines in FIG. 5. During blowing, the preform is secured in the blow mold via the upper portion 12 of the preform and is maintained free from the blow molding applied to the remaining portions of the preform in forming the container. Once preform 10 is formed into the container, blow mold 80 is opened and the completed container 58, as shown in FIG. 4, is removed.

Referring to FIGS. 1-5, for both preform 10 and container 58, and via the processes for the formation of each discussed above, two layers can be used instead of three. In this instance, typical barrier layers 22 and 70 are not used and liner 53 is formed only by one layer, inner layer 20. In this instance, the same process as described above is used for injection molding outer layer 24 over inner layer 20. The steps for finishing the formation of preform 10 into the container via blow molding are the same as described above. In addition, with regard to the thickness of inner layer 20 and inner layer 70, the same relative thicknesses between the portions, discussed above, are preferably used.

With reference to the processes described above for the formation of preform 10 and container 58, these processes can be combined into one process and the process can be automated which would include facilitating a plurality of interconnected stations adapted to perform the steps as described above. Reference is hereby made to U.S. Pat. No. 5,244,610 and No. 5,240,718 disclosing a wheel type plastic blow molding machine combining the steps of preform extrusion and preform blow molding. Each of these patents are assigned to and owned by the Assignee of the present application and the molding device described therein is hereby incorporated herein for use with the instant invention.

The primary advantage of the present invention is that a preform and container, and a process for forming the same, having multiple layers are provided wherein at least one layer has varied thicknesses for different portions of the preform and container having different functions. Another advantage of this invention is that a preform, and process for forming the same, are provided for forming a container which is highly convenient to recycling. Yet another advantage of this invention is that a preform and container are provided having multiple layers, wherein the inner layer varies in thickness at different portions of the container for accomplishing different functions. Still another advantage of this invention is that a multi-layer preform and container is provided wherein each layer has a specific function such as a barrier layer, a contents contact layer, and a outer aesthetic/functional layer.

It is apparent that there has been provided in accordance with this invention multi-layer containers and preforms which fully satisfy the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A multilayer preform for blow molding a container, comprising:

an extruded encircling inner layer which forms a cavity, including:

an upper portion having a first thickness and adapted to be formed into an upper portion of a container;

an intermediate sidewall portion having a second thickness thicker than the first thickness, wherein the intermediate portion is substantially adjacent to the upper portion and adapted to be formed into an intermediate portion of the container; and a base portion having a third thickness thicker than the second thickness, wherein the base portion is substantially adjacent the intermediate portion and adapted to be formed into a base portion of the container;

an outer injection molded layer located substantially adjacent the inner layer and coextensive therewith, wherein the outer layer has a substantially uniform thickness adjacent the intermediate portion of the inner layer and adjacent the base portion of the inner layer; and wherein the preform has an open top, and wherein the upper portion extends to the open top of the preform, and wherein the intermediate portion is an elongated, substantially vertical sidewall portion extending from the upper portion to the base portion.

2. The preform according to claim 1, wherein the preform further includes an extruded barrier layer of material positioned between the inner and outer layers, wherein the barrier layer is co-extruded with the inner layer.

3. The preform according to claim 1, wherein the inner and outer layers have a top edge, and the top edge of the inner layer overlaps the top edge of the outer layer.

4. The preform according to claim 3, wherein the top edge of the inner layer extends transverse to the portions comprising the inner layer and over the top edge of the outer layer.

5. The preform according to claim 1, wherein the outer layer is formed from recycled plastic and the inner layer is formed from polyethylene terephthalate.

6. The preform according to claim 1, wherein the outer injection molded layer includes a threaded upper portion adjacent the upper portion of the inner layer.

7. The preform according to claim 1, wherein the outer layer is colored.

8. The preform of claim 1, wherein the preform includes a barrier layer of ethylene vinyl alcohol copolymer.

9. The preform of claim 2, wherein the barrier layer has a constant thickness.

10. The preform of claim 1, wherein said intermediate portion includes an angled intermediate portion and a vertical intermediate portion.

11. The preform of claim 1, wherein the base portion is a rounded base.

12. The preform of claim 1, wherein the preform has a length from the upper portion to the base portion, and wherein the thickness of the inner layer is varied along the length thereof with the thinnest region being the upper portion thereof, and wherein the thicknesses of the inner and outer layers are independently varied with respect to each other.

13. The preform of claim 1, wherein the intermediate portion is beneath the upper portion and the base portion is beneath the intermediate portion.

* * * * *